March 18, 1958 A. T. KOLTHOFF ET AL 2,826,815
VEST DRAFTING SLIDE RULE
Filed July 17, 1951 2 Sheets-Sheet 1
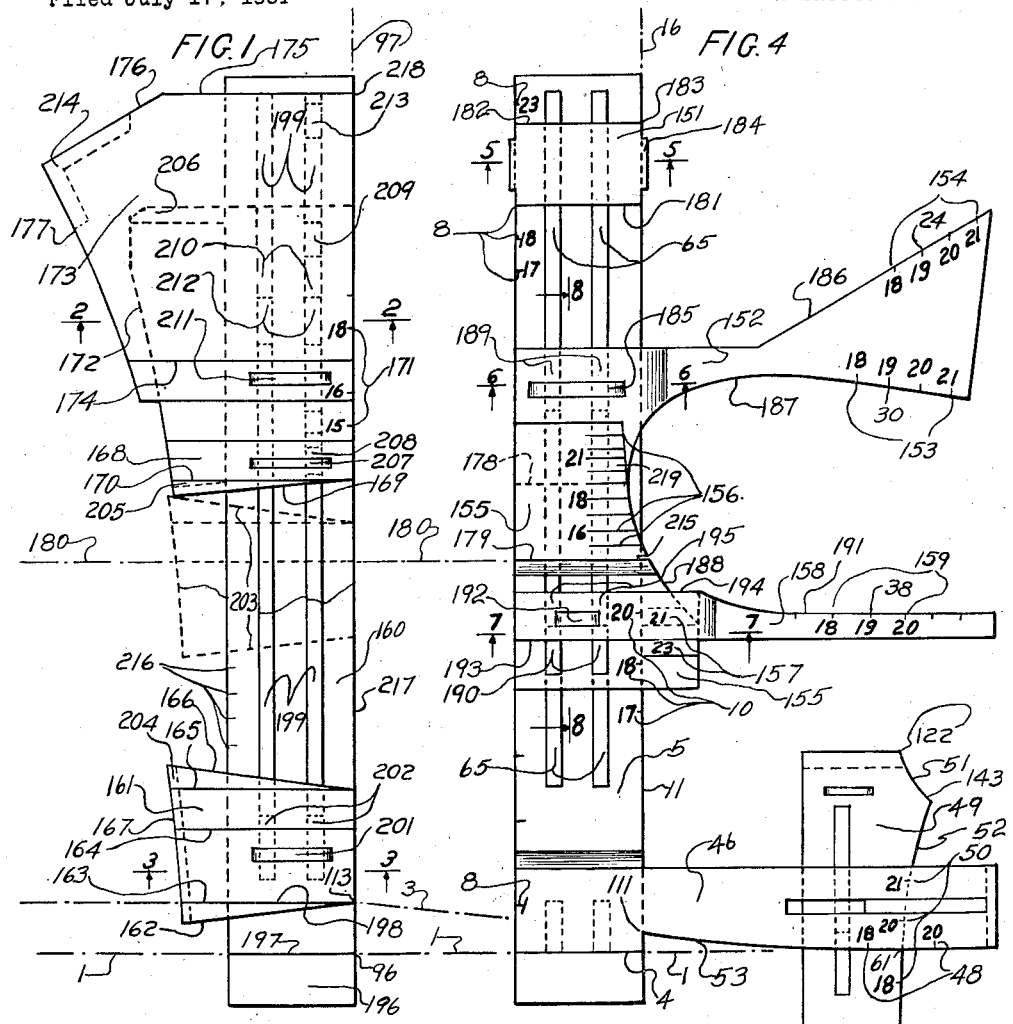
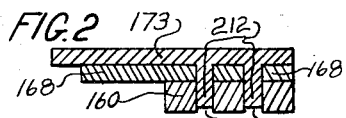
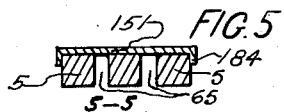
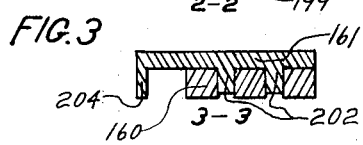
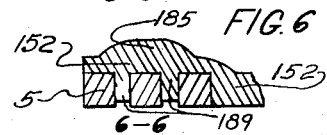
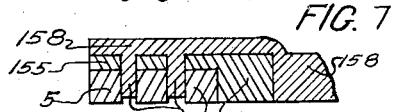
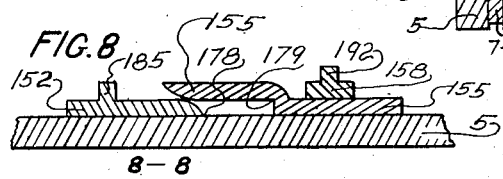
INVENTORS
Aage Thorwald Kolthoff
Hubert Louis Taylor

United States Patent Office 2,826,815
Patented Mar. 18, 1958

2,826,815

VEST DRAFTING SLIDE RULE

Aage T. Kolthoff and Hubert Louis Taylor, New York, N. Y.

Application July 17, 1951, Serial No. 237,249

2 Claims. (Cl. 33—2)

This invention relates to slide rules, but particularly to slide rules for use by tailors in drafting vests. The objects of the vest drafting slide rule are: (1) Reduce the time required for drafting a vest by other methods to about ⅛ that time. (2) Eliminate most of the danger of error resulting from the calculations and numerous measurements necessary when drafting a vest by other methods. (3) To standardize and make possible the continuous reproduction of any previous draft of a vest, or to repeat exactly any draft feature in a vest. As is well known, by other methods, a tailor is never able to draft the same vest unless he has the same patterns previously used, but with the slide rule, all a tailor needs is a record of the settings placed on the slide rule, in order to duplicate the draft. (4) Clarify and simplify the techniques of drafting a vest. (5) Produce a slide rule through which can be seen the material the draft is being made on. (6) Produce a set of rules so made that most of the parts are replaceable. (7) A set of rules that are compact, strong, light, and flexible. (8) A set of rules having a color scheme so that each rule can be distinguished from another by its color. (9) A set of rules whose scales are arranged in accordance with a color scheme so that each may be recognized by its color. (10) A set of rules having its scales and other important markings appearing on the underside so they will not cast shadows of themselves which can be mistaken for the real markings. (11) A set of rules with parts so arranged, shaped, and proportioned that on their scales can be set the number that is half or a fraction of the measurement (according to what is needed), and from the position of the parts indicated by the scales, the tailor be able to obtain the draft of the desired vest, by merely putting checks at some places of the rules and also marking along certain edges of the rule to give an almost completed draft. (12) A set of rules easily assembled or disassembled that is capable of producing drafts for standard or irregular sized vests.

If for example, a tailor had the following measurements: breast 38; waist 34; and as additional measurement the back width 8; and the waist length 18; he could adjust or position the rules on the material upon which the draft is to be made in accordance with the additional measurements (back width and waist length), then, on the proportion scales of the vest breast slide rule set 19; and on the proportion scales of the vest waist slide rule set 17. With these settings he can mark out almost the entire outline of the vest required by the measurements cited.

To further show how these objectives are attained, an example of drafting a vest is used, and a more detailed description is given to accompany the drawing of the vest drafting slide rule, which is comprised of two separate slide rules, the vest breast slide rule and the vest waist slide rule, whose interdependency for drafting a vest will be apparent from the description and figures in which:

Fig. 1 is a plan view of the vest waist slide rule shown placed on two basic lines of the draft, namely: the draft construction line, 1, and the draft waist line, 97, so shown for the purpose of illustrating the use and function of the rule. Due to limited space and to avoid confusion, the scales are not fully numbered throughout, but merely show numeration within the range necessary to cover the example of the draft being used to explain the use of the rule.

Fig. 2 is a transverse elevation sectional view of the vest waist slide rule taken in the plane indicated by the line 2—2 of Fig. 1, and shows how the rear tongues of the top front shaper slide pass through the bottom front shaper slide into the grooves of the vest waist slide rule basic rule.

Fig. 3 is a transverse elevation sectional view of the vest waist slide rule taken in the plane indicated by the line 3—3 of Fig. 1, and shows the leg of the vest back waist slide; the vest back waist slide and its tongues in the grooves of the vest waist slide rule basic rule.

Fig. 4 is a plan view of the vest breast slide rule shown placed on the draft construction line, 1, and on the draft breast line, 16. The additional explanations given under Fig. 1, apply also to Fig. 4.

Fig. 5 is a transverse elevation sectional view of Fig. 4 taken in the plane indicated by the line 5—5 of Fig. 4, and shows how the vest breast allowance slide shoulders engage the vest breast slide rule basic rule to hold the slide in place. It also shows the grooves of the vest breast slide rule basic rule.

Fig. 6 is a transverse elevation fragmentary section view of Fig. 4 taken in the plane indicated by the line 6—6 of Fig. 4, and shows the vest breast slide rule front section tongues in the grooves of the vest breast slide rule basic rule. It also shows the raised section which is the handle of the vest breast slide rule front section slide.

Fig. 7 is a transverse elevation fragmentary sectional view of Fig. 4 taken in the plane indicated by the line 7—7 of Fig. 4, and shows the tongues of the vest breast slide rule back width slide, passing through the grooves of the vest breast slide rule blade armhole slide and into the grooves of the vest breast slide rule basic rule.

Figure 9:
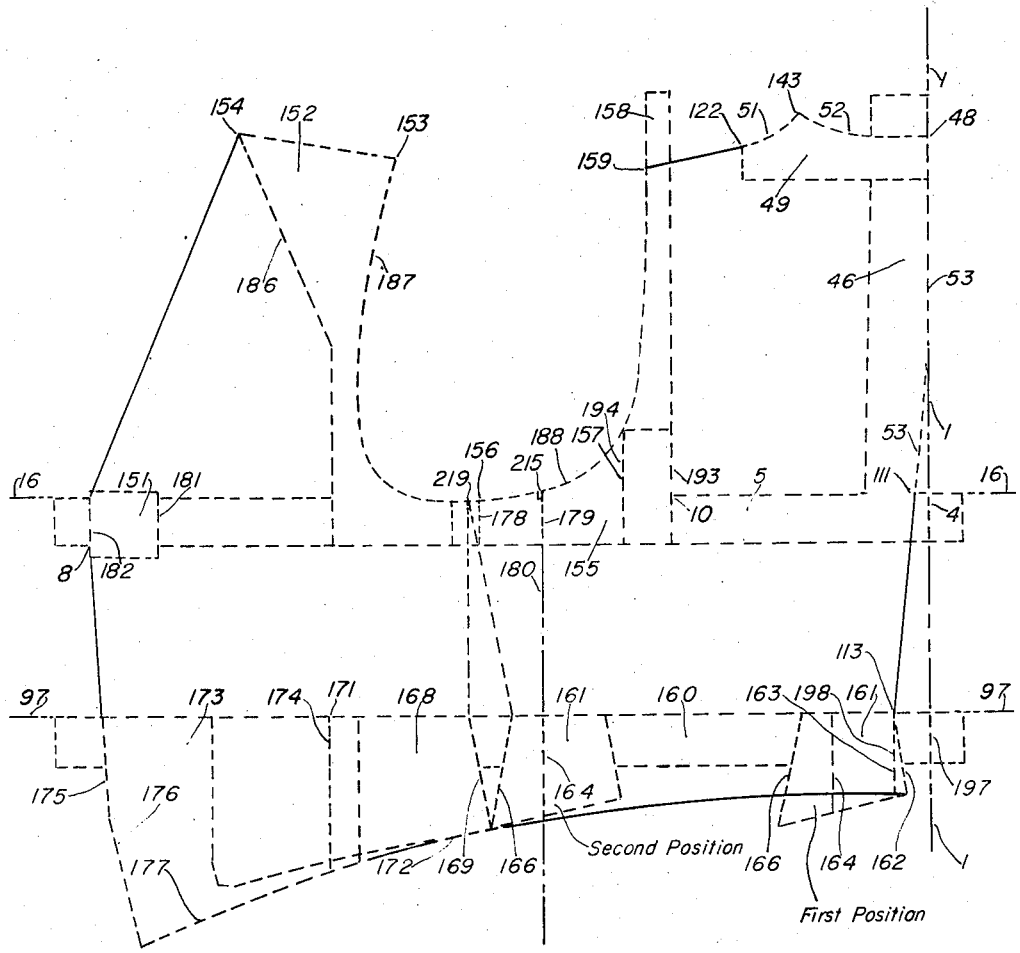

Fig. 8 is a transverse elevation fragmentary sectional view of Fig. 4 taken in the plane indicated by the line 8—8 of Fig. 4, and shows from a side elevation view how the raised part of the vest breast slide rule blade armhole slide rides over the vest breast slide rule front section slide; the position of the vest breast slide rule back width slide with respect to the vest breast slide rule blade armhole slide; and the position of these with respect to the vest breast slide rule basic rule.

Fig. 9 illustrates the drafting of a vest with the vest drafting slide rule.

In order that the detailed description that follows be more easily understood, when the detailed reference is made to each of the two principal figures, the mechanical functioning of the mechanism in the figure will be explained first, then will follow explanation concerning the use and application of the mechanism.

Referring first to Fig. 4, the vest breast slide rule, the mechanical functioning of the breast slide rule basic rule, 5, and the breast slide rule scye depth slide rule, 46, is presented in the specification of "a tailor's coat and overcoat drafting slide rule" in application of Serial #232,176, filed June 18, 1951 and applied for by Aage T. Kolthoff and Hubert Louis Taylor. Therefore only the functioning of the vest breast slide rule blade armhole slide; the vest breast slide rule breast allowance slide; the vest breast slide rule front section slide, 152; and the vest breast slide rule back width slide, 158 will be presented here.

The vest breast slide rule breast allowance slide, 151, shown in Figs. 4 and 5 has one long shoulder, 184 on two sides which impinges on the sides of the vest breast slide rule basic rule, 5, to hold the vest breast slide rule breast allowance slide, 151 on the vest breast slide rule basic rule, 5, as it is slid along the basic rule.

The vest breast slide rule front section slide, 152, shown in Figs. 4, 6, and 8, has a thicker part which extends to the right of the vest breast slide rule basic rule, 5, and rests directly on the material the draft is being made on, while its thinner part which is raised rests and slides on the vest breast slide rule basic rule, 5, and has a pair of tongues, 189 that slide in the vest breast slide rule basic rule grooves, 65, to control and hold the vest breast slide rule front section slide 152 on the basic rule, 5. There is a vertical face at the thicker part of the vest breast slide rule front section slide, 152 where it abuts to the vest breast slide rule basic rule, 5. It is manipulated at the handle, 185, shown in Figs. 4 and 8.

The vest breast slide rule blade armhole slide, 155, shown in Figs. 4, 7 and 8, has a thicker part that extends to the right of the vest breast slide rule basic rule, 5, and has a vertical face where it abuts to the basic rule, 5. Its thinner part slides on the vest breast slide rule basic rule, 5, and has a pair of grooves, 190, that coincide with the vest breast slide rule basic rule grooves, 65. The grooves, 190, extend to where the thinner part is raised (as shown in Fig. 8), so that the raised part can slide over the vest breast slide rule front section slide, 152.

The vest breast slide rule back width slide, 158, shown in Figs. 4, 7 and 8, has a thicker part that extends beyond the right edge of the vest breast slide rule blade armhole slide, 155, as shown in Fig. 7. Its thinner part slides on the thin part of the vest breast slide rule blade armhole slide, 155, as shown in Fig. 8. It has a pair of tongues, 195, which pass through the grooves, 190, of the vest breast slide rule blade armhole slide, 155, and into the vest breast slide rule basic rule grooves, 65. The tongues, 195, hold and guide the vest breast slide rule blade armhole slide, 155, and the vest breast slide rule back width slide, 158, on the vest breast slide rule basic rule, 5. The vest breast slide rule back width slide, 158, is manipulated at its handle, 192, shown in Figs. 4 and 8.

Before the vest breast slide rule, Fig. 4, can be used, the tailor must have at least the following measurements, e. g.: breast 38; waist 34; and additional measurements of back width 8; and waist length 18. Then on the material the draft is to be made on, he marks on, the draft construction line, 1 (shown as a dash-dot line at the lower end of Figs. 4 and 1), designating the right end as the zero end of the line. The next line to be constructed is the draft breast line, 16, at right angles to the draft construction line, 1. To construct it, beginning at the zero end of the construction line, 1, measure 14 inches to the left along the construction line, 1. At this point on the construction line, 1, construct a line (the draft breast line, 16) at right angles to and upwards from the construction line, 1. This draft breast line, 16, is shown also as a dash-dot line at the upper end of Fig. 4.

Now the vest breast slide rule, Fig. 4, may be placed on the draft in such a position that the vest breast slide rule basic rule, construction line, 4, is directly over and on line with the draft construction line, 1; and the right edge, 11, of the vest breast slide rule basic rule, 5, lies directly on the draft breast line, 16.

The next line to be constructed is the draft midway line, 180, which is also shown as a dash-dot line between Figs. 1 and 4. To establish it, the vest breast slide rule back width slide, back width scale matching edge, 193, is matched with mark 19 on the breast slide rule basic rule back width scale, 10; then, holding the vest breast slide rule back width slide, 158, in this position, the vest breast slide rule blade armhole slide, 155, is moved with the left hand until mark 19 on the vest breast slide rule blade armhole slide blade armhole scale, 157, matches the vest breast slide rule back width slide blade armhole scale matching edge, 194. The position of the vest breast slide rule blade armhole slide midway line, 179, resulting from the above operations, establishes the location of the draft midway line, 180 which can now be marked on the draft as a prolongation to the left of the vest breast slide rule blade armhole midway line, 179, for the full length necessary.

From now on the tailor may choose the order in which he wishes to establish the rest of the draft that has to be done with the vest breast slide rule. In this example, I will begin by establishing a point, 183 on the vest draft front balance line at the draft breast line, 16. To do this the vest breast slide rule breast allowance scale matching edge, 181, is matched with the 19th inch on the inch scale, 8, of the breast slide rule basic rule, 5. At the right end of the vest breast slide rule breast allowance slide upper edge, 18, is found point, 183.

Since the size of the vest in the example being used is 38, the basic number that must be struck on the proportion scales of the vest breast slide rule, is 19, which is ½ the size of the vest.

The next operation, then, is to match the vest breast slide rule front section slide scale matching edge, 178, with mark 19 on the vest breast slide rule blade armhole slide armhole proportion scale, 156. Now the draft neck point, 24, is established by putting a check at 19 on the vest breast slide rule front section slide strap proportion scale, 154.

The draft front shoulder point, 30, is established by putting a check at 19 on the vest breast slide rule front section slide front shoulder point proportion scale, 153. From the draft front shoulder point, 30, a line is marked along the vest breast slide rule front section slide front armhole shape line, 187 until it meets the breast slide rule basic rule, 5.

The draft back shoulder height point, 38, is established by placing a check at 19 on the vest breast slide rule back width slide back shoulder height proportion scale, 159. From the draft back shoulder height point, 38, a line is marked along the vest breast slide rule back width slide back height shape line, 191, to the vest breast slide rule blade armhole notch, 215.

The scye depth for the draft is at matching point, 61, which is located at the intersection of mark 19 on the scye depth slide rule proportion scale, 48; and of mark 19, on the scye depth slide rule top back slide top back width proportion scale, 50.

The outline of the back may now be drafted along the scye depth slide rule shoulder back run line, 51, and along the scye depth slide rule top back run line, 52, and along the scye depth slide rule center seam run line, 53. This last line established the draft center seam run line, 3, from matching point, 61, to the intersection, 111, of the draft breast line, 16, and the scye depth slide rule center seam run line, 53.

Referring next to Fig. 1, the vest waist slide rule, it is mechanically arranged and functions as follows: The vest waist slide rule basic rule, 160, shown in Figs. 1, 2 and 3, rest directly on the material the draft is being made on. It has a pair of long grooves, 199, in which move the tongues of the parts that slide on it. It has an inch scale, 216, marked on its left edge; the vest waist slide rule center seam run line, 198, and the vest waist slide rule basic rule construction line, 197, are marked on its lower end. It has an extension, the vest waist slide rule basic rule handle, 196, at its lower end.

The vest waist slide rule back waist slide, 161, shown in Figs. 1 and 3, slides on the vest waist slide rule basic rule, 160, and is guided and held on the rule by the vest waist slide rule back waist slide tongues, 202. It has a leg, 204 which keeps it level. It is manipulated at the handle, 201, and has an inch allowance line 165 (which indicates the sewing line) near the edge embodying the side seam spring shape line 166.

The vest waist slide rule bottom front shaper slide, 168, shown in Figs. 1 and 2, slides on the vest waist slide rule basic rule, 160. It has a rear tongue, 208, and a front tongue, 209 which run in the right groove of the vest waist slide rule basic rule, 160. These tongues guide and hold the slide on the rule. It also has a handle, 207 by which it is manipulated. The vest waist slide rule bottom front shaper slide front waist proportion scale, 171, is located along its right edge. It also has a pair of grooves, 210, shown in Fig. 1, that coincide with the grooves of the vest waist slide rule basic rule, 160. Through the grooves, 210, pass the tongues of the vest waist slide rule top front shaper slide, 173. The bottom front shaper slide rear leg, 205, and the bottom front shaper front leg, 206, shown in Fig. 1, balance the slide. It has an inch allowance line 170 (which indicates the sewing line) near the edge embodying the front side seam spring shape line 169.

The vest waist slide rule top front shaper slide, 173, shown in Figs. 1 and 2, slides on the vest waist slide rule bottom front shaper slide, 168. The top front shaper slide rear tongues, 212, shown in Figs. 1 and 2, pass through the vest waist slide rule bottom front shaper grooves, 210, to reach into the vest waist slide rule basic rule grooves, 199 as shown in Fig. 2. The vest waist slide rule top front shaper slide front tongue, 213, is just as long as the rear tongues, 212, but it only runs in the right groove of the vest waist slide rule basic rule, 160. The vest waist slide rule top front shaper slide leg, 214, shown in Fig. 1, balances the slide. The tongues guide and hold the slide in the rule. The vest waist slide rule top front shaper slide scale matching line, 174, shown in Fig. 1, locates the position of the vest waist slide rule top front shaper slide, 173, when the line is matched with the desired figure on the vest waist slide rule bottom front shaper slide front waist proportion scale, 171. The vest waist slide rule top front shaper slide, 173, is manipulated at the handle, 211 shown in Fig. 1.

The position of the vest waist slide rule, Fig. 1, on the draft, depends upon two measurements: the waist circumference measurement and the waist length, which in the example being used are respectively 34" and 18". The location of the draft waist length point, 96, shown in Fig. 1, is established by measuring 18" along the draft construction line, 1, beginning at the matching point, 61, shown in Fig. 4, at the lower right side. Beginning at the draft waist length point, 96, the draft waist line, 97, shown in Fig. 1, at the top, is drawn upwards at right angles to the draft construction line, 1. Now the vest waist slide rule may be placed on the draft, and in such a position that the vest waist slide rule basic rule construction line, 197, shown in Fig. 1, lies on the draft construction line, 1; and the vest waist slide rule basic rule's right edge, 217, lies on the draft waist line, 97. The vest waist slide rule, Fig. 1, is now in its position on the draft and its parts can be manipulated for further drafting.

The draft center seam waist point, 113, shown in Fig. 1, is established by putting a check at the right end of the vest waist slide rule basic rule center seam run line, 108. Intersection point, 111, shown in Fig. 4, at lower end, is now connected to the draft center seam run waist point, 113, and from point 113, the draft center seam run line, 3, is prolonged to the left, parallel to the draft construction line, 1, for the necessary length.

To begin using the vest waist slide rule, Fig. 1, the vest waist slide rule back waist slide, 161 is moved along the vest waist slide rule basic rule, 160 until the vest waist slide rule back waist slide center seam run line, 163, coincides with the draft center seam run line, 3. With the vest waist slide rule back waist slide 161, in this position, that part of the back waist slide center seam spring shape line, 162, which extends to the left of the vest waist slide rule basic rule, 160, is traced on the draft. Also is traced, the projecting part of the back waist slide finished length edge, 167.

Next the vest waist slide rule back waist slide, 161, is slid to its second and final position on the draft. This position is indicated on the drawing by the number 203 about which is drawn a dash-line outline of the back waist slide, 161. In this position, the vest waist slide rule back waist slide midway line, 164, lies, i. e. coincides with the draft midway line, 180, which was established when the vest breast slide rule, Fig. 4, was being manipulated. Holding the back waist slide, 161, with the left hand in this position, the vest waist slide rule bottom front shaper slide, 168, is moved towards the back waist slide, 161, until the bottom front shaper slide front side seam spring shape line, 169, touches the back waist slide back side seam spring shape line, 166, forming a V opening between them.

Because the waist measurement in the example being used is 34, the number that must be struck on the proportion scale of the vest waist slide rule, is 17, this being half the size. Therefore the vest waist slide rule top front shaper slide, 173 is slid on the bottom front shaper slide, 168 (which is held stationary for this operation) until the top front shaper slide scale matching line, 174, matches 17, on the bottom front shaper slide front waist proportion scale, 171. At the end of this operation, all the parts of the vest waist slide rule, Fig. 1, are in their final position.

The top front shaper slide front balance line, 175, and the top front shaper slide opening shape line, 176, are now traced on the draft. Such parts of the top front shaper slide finished length outline, 177, and of the bottom front shaper slide finished length outline, 172, as are needed to produce the desired finished length outline, are traced on the draft.

After this, the slide rules may be removed from the draft, and the remaining points to be connected are connected by the tailor without the slide rules. He will know that he must connect 61 with 52; 122 to 38; 30 to 24; 24 to 183; 183 to 218.

When a tailor has become familiar with the slide rules he will discover that there are many short cuts he can take with the slide rules for arriving at his draft much faster than by the complete procedure outlined here.

Modifications in the composition, configuration, and disposition of the component elements that make up the invention as a whole are possible by those skilled in the art, therefore no limitation is intended by the phraseology of the foregoing specification or the illustrations accompanying the drawing.

We claim:

1. A vest drafting slide rule comprising a back waist slide with means for slidably engaging a base rule for establishing the vest back outline, back portion of the finished length line, in the waist region, said back waist slide having a portion of the finished length as a curved edge opposite its shortest straight edge, an edge embodying the center seam spring shape line opposite another edge embodying the side seam spring shape line, said back waist slide having a line as the center seam run line extending from the finished length line edge to and intersecting the center seam spring shape line edge at the shortest straight edge for matching with a base rule center seam run line, a line as an inch allowance line extending from the finished length line edge to and intersecting the side seam spring shape line edge at the shortest straight edge, a line as the midway line intermediate between the center seam run line and the inch allowance line and extending from the finished length line edge to the shortest straight edge for establishing the second position of the back waist slide, said back waist slide having a handle, and a leg under its finished length line edge, a bottom front shaper slide and a top front shaper slide, said bottom front shaper slide having means for engaging slidably the base rule and the top front shaper slide, said bottom front shaper slide having a straight edge embodying the front side seam spring shape line joining a slightly outwardly curving edge embodying a portion of the finished length line, a straight line as an inch allowance line extending from the finished length line slightly outwardly curving edge to the straight edge opposite it and intersecting there the front side seam spring shape line edge, a waist proportion scale along the straight edge opposite the slightly outwardly curving edge, 2 legs abutting one edge of the base rule, a handle, said bottom front shaper slide when touching the side seam spring shape line edge of the back waist slide in its second position establishing the position of a second portion of the finished length line.

2. A vest drafting slide rule as in claim 1, said top front shaper slide operating on and over said bottom front shaper slide for establishing the front part of the finished length, the front balance, and the opening shape lines at the waist region, said top front shaper slide having two parallel straight edges parallel to its short axis, an outwardly curving edge embodying a portion of the finished length line joining one of its parallel edges, a straight edge embodying the opening shape line joined at one end to the outwardly curving edge and at the other to the other parallel straight edge embodying the front balance line, a leg under the outwardly curved edge and the edge embodying the opening shape line, a scale matching line parallel to the short axis and near the parallel edge joined to the outwardly curving edge for matching with the indicia of the bottom front shaper slide waist proportion scale for establishing the position of the top front shaper slide, a handle and means for slidably engaging the bottom front shaper slide and the base rule, said finished length line edges of the bottom and top front shaper slides blending into one line as the two slides are extended to their maximum length.

References Cited in the file of this patent
UNITED STATES PATENTS

| | | |
|---|---|---|
| 317,332 | Freeman | May 5, 1885 |
| 460,132 | Havender | Sept. 29, 1891 |
| 1,011,915 | Carbonara | Dec. 19, 1911 |
| 1,190,941 | Needham | July 11, 1916 |
| 1,314,085 | Mastrangelo | Aug. 26, 1919 |
| 1,523,919 | Vitek | Jan. 20, 1925 |
| 1,601,985 | Sniegocki | Oct. 5, 1926 |
| 1,625,453 | Capuano | Apr. 19, 1927 |
| 1,667,646 | Zingali | Apr. 24, 1928 |
| 1,763,091 | Cangimi | June 10, 1930 |
| 2,046,936 | Castronovo | July 7, 1936 |
| 2,365,735 | Ware | Dec. 26, 1944 |
| 2,389,316 | Kirby | Nov. 20, 1945 |

FOREIGN PATENTS

| | | |
|---|---|---|
| 13,109 | Great Britain | Aug. 20, 1889 |